United States Patent
Shikase et al.

(10) Patent No.: US 8,043,537 B2
(45) Date of Patent: Oct. 25, 2011

(54) INJECTION MOLDING SYSTEM, COMPUTER PROGRAM, METHOD OF INJECTION MOLDING, AND INJECTION MOLDING MACHINE

(75) Inventors: Yoshio Shikase, Aichi-ken (JP); Michitaka Hattori, Aichi-ken (JP); Shigeru Nozaki, Aichi-ken (JP); Satoshi Imaeda, Aichi-ken (JP); Toshihiko Kariya, Aichi-ken (JP)

(73) Assignee: Mitsubishi Heavy Industries Plastics Technology Co., Ltd., Nagoya-shi, Aichi (JP)

( * ) Notice: Subject to any disclaimer, the term of this patent is extended or adjusted under 35 U.S.C. 154(b) by 296 days.

(21) Appl. No.: 12/516,117

(22) PCT Filed: Oct. 31, 2007

(86) PCT No.: PCT/JP2007/071214
§ 371 (c)(1),
(2), (4) Date: Aug. 13, 2009

(87) PCT Pub. No.: WO2009/001485
PCT Pub. Date: Dec. 31, 2008

(65) Prior Publication Data
US 2010/0044900 A1 Feb. 25, 2010

(30) Foreign Application Priority Data
Jun. 26, 2007 (JP) .................. 2007-167183

(51) Int. Cl.
*B29C 45/73* (2006.01)
(52) U.S. Cl. .................. 264/40.6; 264/328.16; 425/143; 425/547
(58) Field of Classification Search .............. 264/40.6, 264/328.16; 425/143, 144, 547
See application file for complete search history.

(56) References Cited

U.S. PATENT DOCUMENTS
4,442,061 A 4/1984 Matsuda et al.
(Continued)

FOREIGN PATENT DOCUMENTS
CN 1522282 A 8/2004
(Continued)

OTHER PUBLICATIONS

International Search Report of PCT/JP2007/071214, Mailing Date of Jan. 15, 2008.
(Continued)

*Primary Examiner* — Jill Heitbrink
(74) *Attorney, Agent, or Firm* — Westerman, Hattori, Daniels & Adrian, LLP

(57) ABSTRACT

There are provided an injection molding system, a computer program, a method of injection molding, and an injection molding machine capable of performing precise temperature control of a mold even when there is a delay in temperature increase of the mold in heat supply with a heating medium. The temperature control is performed so that temperatures of a fixed mold and a movable mold are maintained between an upper limit TU and a lower limit TL of a predetermined temperature range after start of injection of resin during an injection molding cycle. The temperature control of the fixed mold and the movable mold is performed only by switching ON/OFF supply of the heating medium, and cooling with a cooling medium is not performed. In a process of cooling the resin, the temperature control is performed so that the temperatures of the fixed mold and the movable mold are maintained between an upper limit TUa and a lower limit TLa of a temperature range effective for resin annealing by stop of supply of the cooling medium and the supply and stop of the heating medium.

19 Claims, 6 Drawing Sheets

U.S. PATENT DOCUMENTS

| | | | |
|---|---|---|---|
| 4,902,454 A * | 2/1990 | Steinbichler et al. | 264/40.6 |
| 6,280,665 B1 * | 8/2001 | Kotzab | 264/40.6 |
| 2005/0001358 A1 | 1/2005 | Nakazawa et al. | |
| 2005/0179157 A1 | 8/2005 | Muranaka et al. | |

FOREIGN PATENT DOCUMENTS

| | | |
|---|---|---|
| CN | 1654185 A2 | 8/2005 |
| EP | 1460107 A1 | 9/2004 |
| EP | 1563975 A2 | 8/2005 |
| JP | 58-12738 A | 1/1983 |
| JP | 05-124077 A | 5/1993 |
| JP | 2001-113577 A | 4/2001 |
| JP | 2003-192884 A | 7/2003 |
| JP | 2005-169925 A | 6/2005 |
| JP | 2005-225042 A | 8/2005 |
| JP | 2005-329577 A | 12/2005 |
| JP | 2006-26967 A | 2/2006 |
| JP | 2007-83502 A | 4/2007 |
| WO | 03/057781 A1 | 7/2003 |
| WO | 2007/034710 A1 | 3/2007 |

OTHER PUBLICATIONS

Korean Office Action dated Nov. 30, 2010, issued in corresponding Korean Patent Application No. 10-2009-7007761.

Taiwanese Office Action dated Jan. 27, 2011, issued in corresponding Taiwanese Patent Application No. 096147424.

* cited by examiner

INJECTION MOLDING SYSTEM, COMPUTER PROGRAM, METHOD OF INJECTION MOLDING, AND INJECTION MOLDING MACHINE

TECHNICAL FIELD

The present invention relates to an injection molding system for injection molding, a method of injection molding, an injection molding machine or the like.

BACKGROUND ART

When a temperature of a mold is low in an injection filling step of an injection molding machine, a surface of molten resin filled in a cavity of the mold is rapidly solidified. In this case, a cavity surface of the mold may be insufficiently transferred to a molded product, and a defect referred to as a weld line or a silver streak may occur on a molded product surface.

In order to prevent the defect, a molding method has been proposed in which a heating medium is supplied to a medium passage of a mold during a time between mold opening and completion of resin filling, and a cooling medium is supplied during a time between the completion of resin filling and mold opening in a series of steps including injection filling, pressure retention, cooling, and mold opening and closing. Thus, molten resin is filled in a mold previously heated to a temperature equal to or higher than a thermal deformation temperature of resin to delay solidification of a resin surface, and after the resin filling, the mold can be cooled to a temperature equal to or lower than a glass transition temperature or the thermal deformation temperature of resin before mold opening, thereby preventing the above described defect.

However, taking a long pressure retaining time for a thick molded product or the like may cause a molding defect such as a sink mark if a temperature of a mold is reduced during pressure retention after completion of injection and cooling and solidification of the molded product proceed. Also, increasing a heating temperature of the mold to increase the time for pressure retention may increase a cooling time to reduce productivity and waste heating energy consumed. Further, a low heating temperature of the mold cannot provide a sufficient pressure retaining time.

Some molded products are molded from crystalline resin by injection molding. The crystalline resin is resin crystallized during injection molding. The crystalline resin includes resin with high crystallization speed such as polypropylene or polyethylene and resin with low crystallization speed such as polylactic acid. The crystalline resin can be increased in the degree of crystallization and thus increased in strength, and can be applied to a functional component. Thus, a molding method for increasing the degree of crystallization is much needed.

However, for the crystalline resin with low crystallization speed, the resin sometimes cannot be sufficiently crystallized during injection molding, and temperature control during injection molding has been improved to ensure crystallization (for example, see Patent Document 1).

In the technique described in Patent Document 1, crystallization of crystalline resin is more efficiently performed during temperature increase than temperature decrease, and thus the temperature is reduced to a temperature range or lower where the crystalline resin is crystallized and then the temperature is again increased to promote crystallization of the crystalline resin.

Patent Document 1: Japanese Patent Laid-Open No.

DISCLOSURE OF THE INVENTION

Problems to be Solved by the Invention

However, in the technique described in Patent Document 1, water vapor is used as a heat medium for temperature control during injection molding. Generally, when temperature control is actively performed using a heat medium during injection molding, a temperature is required to be rapidly increased or decreased for shortening molding cycles. Metal used in a mold material is generally carbon steel and has a high specific heat, and also a molded surface inside the mold is away from an area where water vapor comes into contact with the mold. Thus, heat transfer takes time between the area where water vapor comes into contact with the mold and the molded surface, causing a time delay in temperature change. Since delicate temperature control of the water vapor is not easy, overheated vapor at a temperature much higher than a target temperature is generally used. Thus, when a mold temperature reaches the target temperature, an excessive amount of heat has been supplied from the water vapor to the mold. Further, heat supply from molten resin during injection increases the temperature of the mold, thereby preventing precise temperature control.

For example, even if a sensor detects that a temperature near the molded surface reaches a set temperature to immediately stop heating with the water vapor, the temperature near the molded surface is further increased by heat of the water vapor having transferred to the area where the water vapor comes into contact with the mold and the heat supply from the molten resin during the injection as shown in FIG. 6 (this is referred to as overshooting). The temperature increases to a temperature corresponding to the heat from the water vapor and the molten resin and then starts to decrease. Particularly when a molding material is crystalline resin, crystallization of the crystalline resin does not proceed while the temperature near the molded surface exceeds a temperature range where the crystalline resin is easily crystallized because of the overshooting. Thus, the overshooting reduces a time during which the mold temperature remains within the temperature range where the crystalline resin is easily crystallized, and thus the efficiency of crystallization has room for improvement.

In the technique described in Patent Document 1, heat is released by cooling to reduce the temperature to the temperature range or lower where the crystalline resin is crystallized, and then the temperature is again increased to the temperature range where the crystalline resin is crystallized, which is not energy efficient. Further, when the temperature is reduced to the temperature range or lower where the crystalline resin is crystallized, molecules of the crystalline resin cannot easily move. Heating in this state to promote crystallization may cause a sudden layer change, resulting in variations in the state of molecules and variations in crystallization quality.

Resin injected and filled in a mold comes into contact with a mold at a lower temperature than the resin and is cooled, but a difference in cooling speed occurs between a skin layer near a surface of the resin that comes into contact with the mold and a core layer located inside. Then, a difference in the degree of contraction occurs between near the surface of the resin and the inside, causing residual stress in a molded product obtained. With the residual stress, the molded product is warped and reduced in molding quality. In order to prevent this, it is supposed that the resin is slowly cooled rather than rapidly cooled in the mold, or the molded product is removed from the mold and then soaked in hot water at a predetermined temperature for annealing, which prevents increase in production efficiency.

The present invention is achieved on the basis of such technical problems, and has an object to provide an injection molding system, a computer program, a method of injection molding, and an injection molding machine capable of reliably and efficiently performing crystallization of crystalline resin.

Means for Solving the Problems

To achieve the object, the present invention provides an injection molding system comprising: an injection molding machine including a mold clamping device for opening and closing a mold and an injection device for injecting a molding material into a cavity of the mold; a heating medium supply device for supplying a heating medium to a heat medium passage formed in the mold for heating the cavity; a cooling medium supply device for supplying a cooling medium to the heat medium passage for cooling the cavity; and a control unit for controlling supply of the heating medium and the cooling medium by the heating medium supply device and the cooling medium supply device, supplying the heating medium to the heat medium passage to heat the cavity when the molding material is injected from the injection device into the cavity, and supplying the cooling medium to the heat medium passage in conjunction with injection of the molding material to cool the cavity. The control unit starts the injection of the molding material or stops heating of the cavity during the injection before a temperature of the cavity reaches a predetermined temperature range so that the temperature of the cavity does not exceed the predetermined temperature range during the injection of the molding material, and then maintains the temperature of the cavity within the predetermined temperature range after the temperature of the cavity reaches the predetermined temperature range and until the cooling medium is supplied to start cooling of the cavity.

As such, the temperature of the cavity is maintained within the predetermined temperature range after the injection of the molding material is started and the temperature of the cavity reaches the predetermined temperature range and until the cooling medium is supplied to start cooling of the cavity. Thus, even when a long pressure retaining time is taken for a thick molded product or the like, cooling and solidification of the molded product can be prevented to apply sufficient retaining pressure without sacrificing productivity and energy consumption. The cavity temperature is increased by a delay of heat transfer from the heating medium and heat from molten resin during the injection still after the heating is stopped. Thus, the injection of the molding material is started or the heating of the cavity is stopped during the injection before the temperature of the cavity reaches the predetermined temperature range, and thus temperature control can be performed in a temperature increasing process including an amount of heat supplied from the heating medium and the molten resin, thereby preventing so-called overshooting in which the temperature of the cavity exceeds the predetermined temperature range. This allows the temperature of the cavity to be maintained within the predetermined temperature range for a long time.

Thus, particularly when the molding material is crystalline resin, the degree of crystallization can be increased to provide a molded product with high strength.

The control unit starts the injection of the molding material or stops the heating of the cavity during the injection before the temperature of the cavity reaches the predetermined temperature range, and thus preferably can stop the heating of the cavity at an end of a timer that starts with the start of the heating of the cavity, or by detection that the temperature of the cavity reaches a predetermined temperature so as not to exceed an upper limit of the predetermined temperature range of the molding material. Specifically, the stop of the heating can be controlled selectively by the timer or the temperature of the cavity to effectively facilitate the control.

Using vapor as the heating medium is effective for reducing a temperature increasing time because a high heating medium temperature can be obtained. Using a liquid as the heating medium facilitates preventing overshooting because the heating medium temperature can be relatively easily controlled to a target temperature.

The control unit preferably switches ON/OFF the supply of the heating medium to the heat medium passage to maintain the temperature of the cavity within the predetermined temperature range. With a wide predetermined temperature range, the cooling medium may be introduced into the heat medium passage when the supply of the heating medium to the heat medium passage is OFF, while with a narrow predetermined temperature range such as a temperature range where the crystalline resin is easily crystallized, the heating medium is preferably maintained in the heat medium passage when the supply of the heating medium to the heat medium passage is OFF. Specifically, when the supply of the heating medium to the heat medium passage is OFF, the cooling medium is not introduced into the heat medium passage. Particularly when vapor is used, it is effective to discharge the vapor in the heat medium passage to the outside by blowing air to prevent the vapor in the heat medium passage from being solidified into water by natural heat dissipation when the supply of the heating medium is stopped.

Thus, while the temperature of the cavity is maintained within the predetermined temperature range, the temperature of the cavity can be maintained in a narrow temperature range for a long time without excessive cooling leading to under shooting, the temperature control can be performed with good response, and thermal energy can be effectively used.

Between the heating medium supply device and the heat medium passage, there are preferably provided a supply pipe for feeding the heating medium from the heating medium supply device to the heat medium passage, a discharge pipe for discharging the heating medium from the heat medium passage, and a bypass pipe for connecting the supply pipe and the discharge pipe, and bypassing the heating medium from the supply pipe to the discharge pipe when the supply of the heating medium to the heat medium passage by the heating medium supply device is OFF.

The bypass pipe is provided to bypass the heating medium from the supply pipe to the discharge pipe when the supply of the heating medium is OFF, thereby allowing the heating medium heated by the heating medium supply device to be always circulated. Thus, the heated heating medium rapidly flows into the heat medium passage when the supply of the heating medium is ON to allow rapid heating.

The bypass pipe is preferably connected near a connection between the supply pipe and the heat medium passage. Thus, the heated heating medium immediately flows into the heat medium passage when the supply of the heating medium is ON to allow rapider heating. A bypass may be provided in the cooling medium passage for maintaining a low temperature of the cooling medium.

The control unit preferably supplies the heating medium to the heat medium passage to heat the cavity, stops the heating of the cavity at a lower temperature than the predetermined temperature range and maintains the temperature of the cavity within a temperature range including the temperature at which the heating is stopped for a predetermined time before the temperature of the cavity reaches the predetermined temperature range. The temperature is maintained during the heating to provide uniform temperature distribution of the mold. Thus, heating thereafter can be rapidly and efficiently performed with high accuracy.

If the injection is performed within the temperature range lower than the predetermined temperature range and including the temperature at which the heating is stopped, heat supply from the molten resin by the injection as rapid heating can be performed while the temperature is maintained during the heating, thereby effectively preventing so-called overshooting in which the temperature exceeds the predetermined temperature range. Further, the heating thereafter can be rapidly and efficiently performed with high accuracy.

The control unit can supply the cooling medium after the injection of the molding material is completed in a process of supplying the cooling medium to the heat medium passage to cool the cavity. For the temperature of the cavity, a response of a substantial temperature change is delayed from the start of the supply of the heat medium. Thus, in order to start a reduction in the temperature of the cavity at the time of the completion of the injection for shortening molding cycles, it is effective that the control unit supplies the cooling medium before the completion of the injection by a delay of a cooling response in the process of supplying the cooling medium to the heat medium passage to cool the cavity. After the supply of the cooling medium is stopped, the control unit preferably maintains the temperature of the cavity within a temperature range where resin is annealed. Annealing is performed in the cooling process in a series of molding cycles to save trouble for separate annealing. Further, it is effective that temperature control is performed for maintaining the temperature of the cavity within a temperature range effective for annealing.

The supply of the heating medium or the cooling medium to the heat medium passage for maintaining the temperature of the cavity within the temperature range effective for annealing is preferably switched ON/OFF. When a small amount of resin is injected and filled into the cavity, a large amount of heat of the resin is removed by the mold in cooling. Thus, the heating medium needs to be supplied to maintain the temperature of the cavity within the temperature range effective for annealing after the stop of the cooling. When a large amount of resin is injected and filled into the cavity, a sufficient amount of heat of the resin remains even if the heat is removed by the mold in cooling. Thus, the cooling can be stopped to again increase the temperature of the mold with the amount of heat of the resin, and thus the supply of the cooling medium can be switched ON/OFF to maintain the temperature of the cavity within the temperature range effective for annealing.

When crystalline resin is used as the molding material, it is effective that the control unit controls the predetermined temperature range to a temperature range where crystallization of a crystalline molding material proceeds to maintain the temperature. The crystalline resin has a large amount of contraction in solidification and ensures a long pressure retaining time to effectively prevent a molding defect such as a sink mark. Particularly when the molding material is crystalline resin with a low crystallization speed, a sufficient time for crystallization can be obtained to effectively increase resin strength.

As such, the temperature of the cavity is maintained within the predetermined temperature range after the injection of the molding material is started and the temperature of the cavity reaches the predetermined temperature range and until the cooling medium is supplied to start the cooling of the cavity. Thus, even when a long pressure retaining time is taken for a thick molded product or the like, cooling and solidification of the molded product can be prevented to apply sufficient retaining pressure without sacrificing productivity and energy consumption. The cavity temperature is increased by a delay of heat transfer from the heating medium and heat from the molten resin during the injection still after the heating is stopped. Thus, the injection of the molding material is started or the heating of the cavity is stopped during the injection before the temperature of the cavity reaches the predetermined temperature range, and thus temperature control can be performed in a temperature increasing process including an amount of heat supplied from the heating medium and the molten resin, thereby preventing so-called overshooting in which the temperature of the cavity exceeds the predetermined temperature range. This allows the temperature of the cavity to be maintained within the predetermined temperature range for a long time. Particularly when the molding material is crystalline resin, the mold temperature is always maintained within the temperature range where crystallization of the resin proceeds, which does not prevent molecules of the resin from being easily moved unlike the case where the temperature is reduced to a temperature lower than the temperature range.

The present invention may provide a computer program for causing a control unit to execute a predetermined processing, the control unit controlling supply of a heating medium and a cooling medium to a heat medium passage formed in a mold of an injection molding machine for controlling a temperature of a cavity of the mold. The computer program comprises the steps of: supplying the heating medium to the heat medium passage to heat the cavity when injecting a molding material into the cavity; starting the injection of the molding material or stopping heating of the cavity during the injection before the temperature of the cavity reaches a predetermined temperature range so that the temperature of the cavity does not exceed the predetermined temperature range; maintaining the temperature of the cavity within the predetermined temperature range after the temperature of the cavity reaches the predetermined temperature range; and supplying the cooling medium to the heat medium passage to cool the cavity after completion of the injection of the molding material or before the completion of the injection by a delay of a cooling response.

In order to maintain the temperature of the cavity within the predetermined temperature range, the temperature of the cavity may be detected and the supply of the heating medium to the heat medium passage may be controlled on the basis of the detected temperature, or the supply of the heating medium to the heat medium passage may be controlled on the basis of various elapsed times such as a time after the start of the injection. The temperature control may use PID (P: proportional, I: integral and D: derivative) control.

When crystalline resin is used as the molding material, it is effective that the predetermined temperature range is set to a temperature range where crystallization of a crystalline molding material proceeds. The crystalline resin has a large amount of contraction in solidification and ensures a long pressure retaining time to effectively prevent a molding defect such as a sink mark. Particularly when the molding material is crystalline resin with a low crystallization speed, a sufficient time for crystallization can be obtained, which does not prevent the molecules of the resin from being easily moved unlike the case where the temperature is reduced to a temperature lower than the temperature range, and is effective for increasing resin strength.

The present invention may provide a method of injection molding comprising the steps of: supplying a heating medium to a heat medium passage provided in a mold to heat the cavity when injecting a molding material into the cavity; starting the injection of the molding material or stopping heating of the cavity during the injection before the temperature of the cavity reaches a predetermined temperature range so that the temperature of the cavity does not exceed the predetermined temperature range; maintaining the temperature of the cavity within the predetermined temperature range after the temperature of the cavity reaches the predetermined temperature range; and supplying the cooling medium to the heat medium passage to cool the cavity after completion of the injection of the molding material or before the completion of the injection by a delay of a cooling response. When crystalline resin is used as the molding material, it is effective that the predetermined temperature range is set to a temperature range where crystallization of a crystalline molding material proceeds. The crystalline resin has a large amount of contraction in solidification and ensures a long pressure retaining time to effectively prevent a molding defect such as a sink mark. Also, a sufficient time for crystallization can be obtained, which does not prevent the molecules of the resin from being easily moved unlike the case where the temperature is reduced to a temperature lower than the temperature range, and is effective for increasing resin strength.

The present invention may provide an injection molding machine comprising: a mold driving unit for opening and closing a mold; an injection cylinder for injecting a crystalline molding material into a cavity of the mold; a heating medium supply mechanism for supplying a heating medium to a heat medium passage formed in the mold for heating the cavity; a cooling medium supply mechanism for supplying a cooling medium to the heat medium passage for cooling the cavity; and a control unit for controlling supply of the heating medium and the cooling medium by the heating medium supply mechanism and the cooling medium supply mechanism, supplying the heating medium to the heat medium passage to heat the cavity when the molding material is injected from the injection cylinder into the cavity, and supplying the cooling medium to the heat medium passage to cool the cavity after the injection of the molding material is completed, wherein the control unit stops heating of the cavity before starting the injection of the molding material from the injection cylinder into the cavity so that the temperature of the cavity does not exceed a temperature range where crystallization of the molding material proceeds, and maintains the temperature of the cavity within the temperature range where crystallization of the molding material proceeds after the injection of the molding material from the injection cylinder into the cavity is started and until the cooling medium is supplied to start cooling of the cavity.

The injection molding machine may further comprises a supply pipe for feeding the heating medium from the heating medium supply mechanism to the heat medium passage; a return pipe for returning the heating medium discharged from the heat medium passage to the heating medium supply mechanism; and a bypass pipe for connecting the supply pipe and the return pipe and bypassing the heating medium from the supply pipe to the return pipe when the supply of the heating medium to the heat medium passage by the heating medium supply mechanism is OFF.

Advantages of the Invention

According to the present invention, the temperature control is performed so that the cavity temperature is maintained within the predetermined temperature range after the injection of the resin is started. Thus, even when a long pressure retaining time is taken for a thick molded product or the like, cooling and solidification of the molded product can be prevented to sufficiently apply retaining pressure without sacrificing productivity and energy consumption.

At this time, supply timing of the heating medium is set so that the mold temperature that is increased by a delay of heat transfer still after the stop of the heating does not exceed an upper limit of the predetermined temperature range, and thus the temperature can be maintained within the predetermined temperature range for a long time, and a long pressure retaining time can be ensured to effectively prevent a molding defect such as a sink mark. The temperature control of the mold is performed only by switching ON/OFF the supply of the heating medium, thereby facilitating the temperature control. The temperature control is performed within the predetermined temperature range, and thus can be efficiently performed without excessive cooling or the like. Further, the mold temperature is always maintained within the predetermined temperature range, and particularly when the molding material is crystalline resin with a low crystallization speed, a sufficient time for crystallization can be obtained, which does not prevent the molecules of the resin from being easily moved unlike the case where the temperature is reduced to a temperature lower than the temperature range, and prevents variations in crystallization quality.

In the process of cooling the resin, the temperature control is performed so that the mold temperature is maintained within the temperature range effective for resin annealing. Thus, resin annealing can be reliably performed in a series of injection molding cycles. At this time, rapid cooling with the cooling medium can be performed before and after the annealing to shorten the molding cycles.

DESCRIPTION OF SYMBOLS

Figure 1:
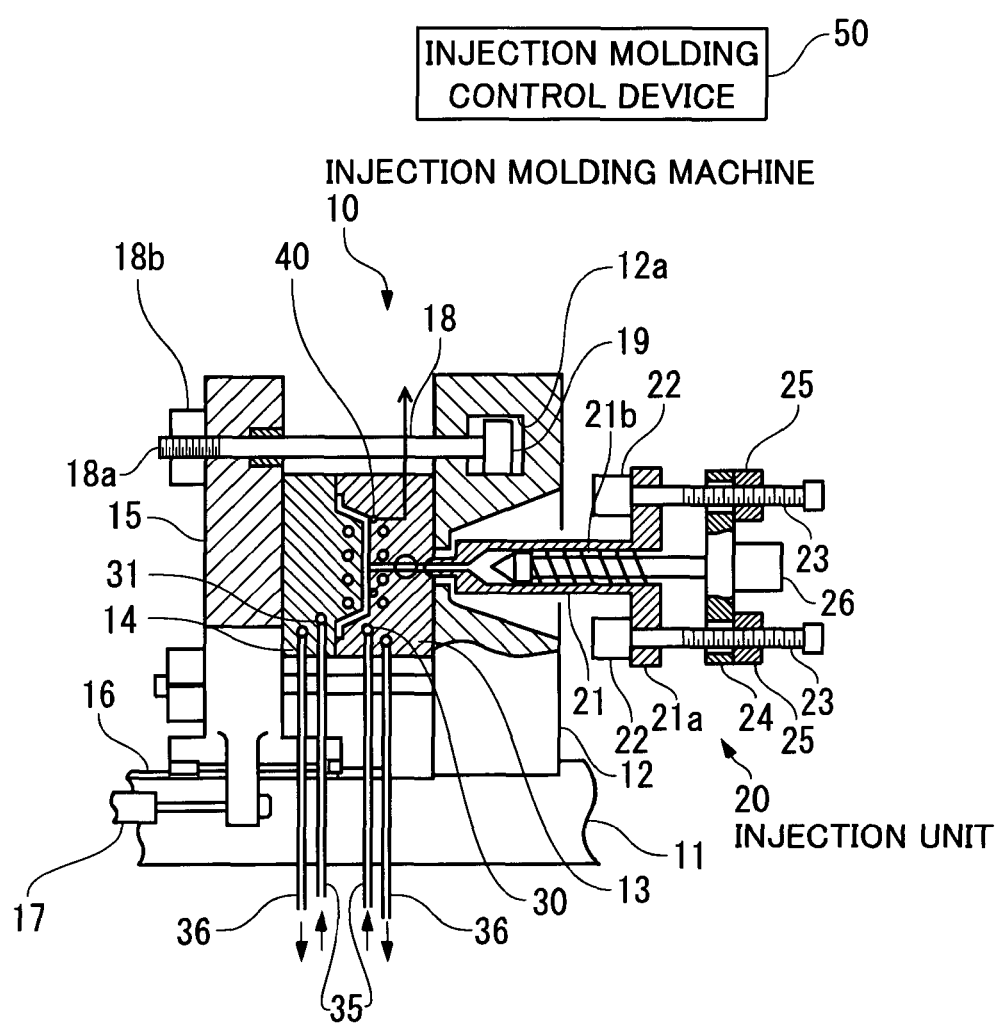
FIG. 1 shows a configuration of an injection molding system according to an embodiment.

10 . . . injection molding system (injection molding machine)
12 . . . fixed die plate
13 . . . fixed mold
14 . . . movable mold
15 . . . movable die plate
20 . . . injection device
21 . . . injection cylinder (injection device)
30, 31 . . . heat medium water passage (heat medium passage)
33 . . . heating medium supply device (heating medium supply mechanism)
34 . . . cooling medium supply device (cooling medium supply mechanism)
35 . . . heating medium delivery pipe (supply pipe)
36 . . . heating medium discharge pipe (discharge pipe)
37 . . . cooling medium delivery pipe
38 . . . cooling medium discharge pipe 39 . . . bypass pipe
40 . . . mold temperature sensor
50 . . . injection molding control device (control unit)

BEST MODE FOR CARRYING OUT THE INVENTION

Now, the present invention will be described in detail for the case of using crystalline resin, which is the most effective, with reference to an embodiment shown in the accompanying drawings.

FIG. 1 is a schematic view of a configuration of an injection molding system (injection molding machine) 10 according to the embodiment.

As shown in FIG. 1, in a mold clamping device (mold driving unit) of the injection molding system 10, a fixed die plate 12 is secured to a base 11 and a fixed mold 13 is mounted to the fixed die plate 12. A movable mold 14 facing the fixed mold 13 is mounted to a movable die plate 15 placed to face the fixed die plate 12. The movable die plate 15 is guided by a guide rail 16 provided on the base 11, and is movable via a linear bearing while facing the fixed die plate 12. A hydraulic cylinder 17 is used to move the movable die plate 15 for opening and closing a mold.

A plurality of tie bars 18 are directly connected to rams 19 that slide in a plurality of mold clamping hydraulic cylinders 12a included in the fixed die plate 12. A tip of each tie bar 18 passes through a through hole in the movable die plate 15. A thread groove 18a is formed on the tip of the tie bar 18, and a half nut 18b placed on the side opposite from the mold of the movable die plate 15 engages the thread groove 18a to secure a pulling direction of the tie bar 18.

An injection device 20 is of an electrically driven type.

An injection cylinder (injection device) 21 including a nozzle that abuts against a resin inlet of the fixed mold 13 has a frame 21a integrally formed with the injection cylinder 21. A pair of injection drive servomotors 22 and 22 are mounted to the frame 21a symmetrically with respect to a centerline of the injection cylinder 21, and ball screw shafts 23 and 23 are directly connected to output shafts of the servomotors 22 and 22. A pair of ball screw nuts 25 and 25 mounted to a movable frame 24 are threaded on the ball screw shafts 23 and 23. The pair of injection drive servomotors 22 and 22 are synchronously rotationally driven to move the injection screw 21b axially forward and backward in the injection cylinder 21.

The injection screw 21b of the injection cylinder 21 is rotationally driven by an injection screw rotation drive motor 26 mounted to the movable frame 24 to rotationally deliver and plasticize resin in the injection cylinder 21.

An injection molding control device (control unit) 50 supplies hydraulic oil to the mold clamping hydraulic cylinder 12a, supplies a current to the injection drive servomotors 22 and 22 of the injection device 20 to move the injection screw 21b forward and backward, and supplies a current to the injection screw rotation drive motor 26 of the injection screw 21b to instruct plasticization of the resin according to a program of a molding step.

The injection device 20 injects molten resin into a mold cavity formed by mold clamping of the fixed mold 13 and the movable mold 14. After the molded product is cooled and solidified, the movable mold 14 is released from mold clamping to the fixed mold 13 and separated from the fixed mold 13 by an operation of the moving hydraulic cylinder 17 to remove a molded product.

Heat medium water passages (heat medium passages) 30 and 31 for heating and cooling a mold surface are formed in the fixed mold 13 and the movable mold 14. The heat medium water passages 30 and 31 are connected to outlets and inlets of heat medium water provided in the fixed mold 13 and the movable mold 14. The heat medium water passages 30 and 31 are formed as close as possible to a mold cavity for rapidly transferring heat to rapidly heat and cool a mold cavity surface.

Figure 2:
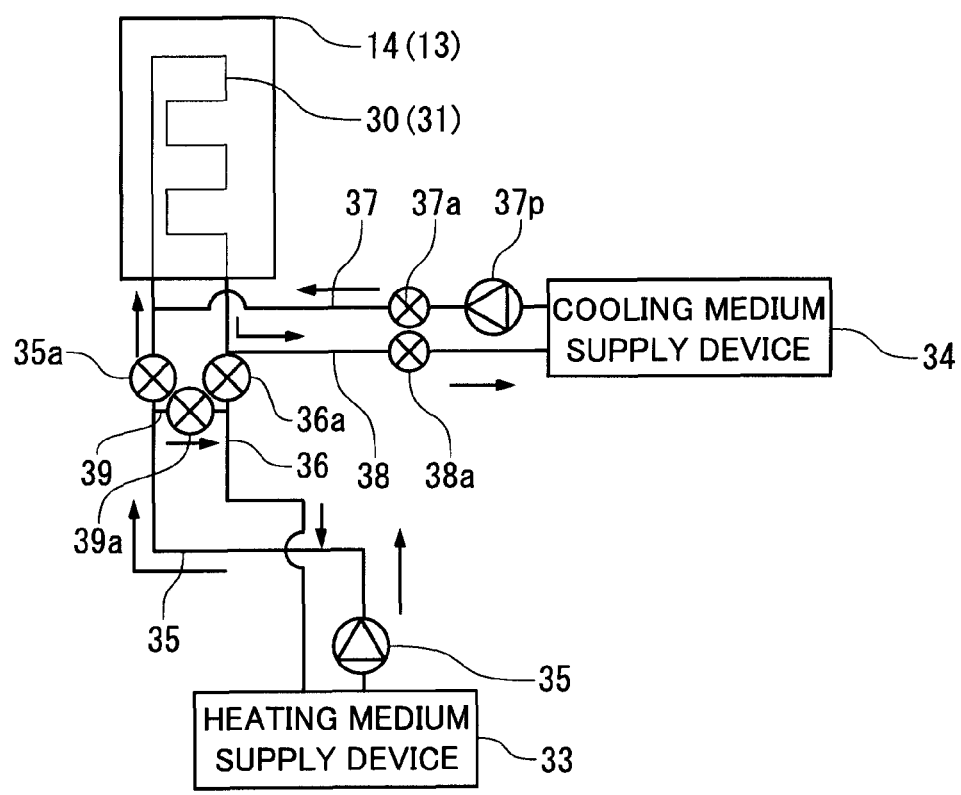
FIG. 2 shows a configuration for controlling a temperature of a mold.

As shown in FIG. 2, a heating medium supply device (heating medium supply mechanism) 33 for supplying a heating medium and a cooling medium supply device (cooling medium supply mechanism) 34 for supplying a cooling medium are connected to the heat medium water passages 30 and 31. The heating medium supply device 33 and the cooling medium supply device 34 are provided in the same configuration in the heat medium water passages 30 and 31 provided in the fixed mold 13 and the movable mold 14, and thus a configuration of the movable mold 14 is shown in FIG. 2. In the embodiment, water (liquid) is used as the heating medium and the cooling medium, and the heating medium supply device 33 and the cooling medium supply device 34 supply the heating medium and the cooling medium controlled to a predetermined temperature.

A heating medium delivery pipe (supply pipe) 35 for feeding the heating medium into the heat medium water passages 30 and 31 with a pump 35, and a heating medium discharge pipe (discharge pipe) 36 for circulating the heating medium having passed through the heat medium water passages 30 and 31 to the heating medium supply device 33 are connected to the heating medium supply device 33. A cooling medium delivery pipe 37 for feeding the cooling medium to the heat medium water passages 30 and 31 with a pump 37p, and a cooling medium discharge pipe 38 for circulating the cooling medium having passed through the heat medium water passages 30 and 31 to the cooling medium supply device 34 are connected to the cooling medium supply device 34. The heating medium delivery pipe 35, the heating medium discharge pipe 36, the cooling medium delivery pipe 37, and the cooling medium discharge pipe 38 include openable and closable on-off valves 35a, 36a, 37a and 38a, respectively. The ON/OFF of the on-off valves 35a, 36a, 37a and 38a is controlled on the basis of a predetermined program by an injection molding control device 50.

Figure 3:
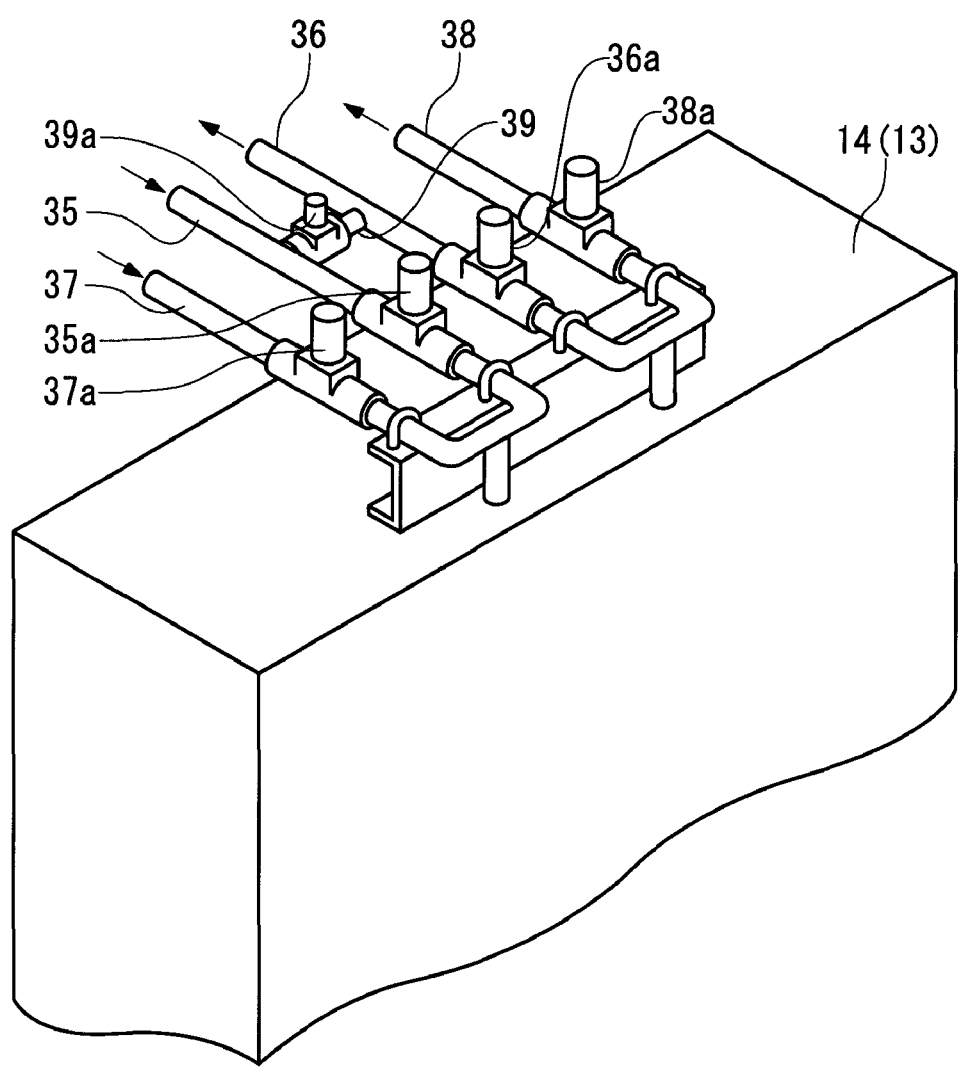
FIG. 3 shows a bypass pipe provided near the mold.

A bypass pipe 39 connecting the heating medium delivery pipe 35 and the heating medium discharge pipe 36 is provided therebetween. The bypass pipe 39 includes an openable and closable changeover valve 39a, and the ON/OFF thereof is controlled on the basis of a predetermined program by the injection molding control device 50. As shown in FIG. 3, the bypass pipe 39 and the on-off valves 35a and 36a are preferably provided as close as possible to the fixed mold 13 and the movable mold 14, for example, immediately below the fixed die plate 12 or the movable die plate 15, or on a side surface of the fixed die plate 12 or the movable die plate 15. In order to immediately feed the cooling medium into the heat medium water passages 30 and 31 to more rapidly cool the mold cavity when the supply of the cooling medium is ON, the on-off valves 37a and 38a provided in the cooling medium delivery pipe 37 and the cooling medium discharge pipe 38 are also preferably provided as close as possible to the fixed mold 13 and the movable mold 14, for example, immediately below the fixed die plate 12 or the movable die plate 15, or on a side surface of the fixed die plate 12 or the movable die plate 15, besides the on-off valves 35a and 36a.

As shown in FIG. 1, a mold temperature sensor 40 is placed to face cavity surfaces of the fixed mold 13 and the movable mold 14. A signal of a temperature detected by the mold temperature sensor 40 is transmitted to the injection molding control device 50. The injection molding control device 50 opens and closes the on-off valves 35a, 36a, 37a and 38a and the changeover valve 39a, and controls the supply of the heating medium and the cooling medium to the heat medium water passages 30 and 31 on the basis of the temperature detected by the mold temperature sensor 40 as described below.

When the fixed mold 13 and the movable mold 14 are heated, the on-off valves 35a and 36a are opened and the on-off valves 37a and 38a and the changeover valve 39a are closed, and the heating medium heated by the heating medium supply device 33 is fed into the heat medium water passages 30 and 31.

When the fixed mold 13 and the movable mold 14 are cooled, the on-off valves 35a and 36a are closed and the on-off valves 37a and 38a are opened, and the cooling medium supplied from the cooling medium supply device 34 is fed into the heat medium water passages 30 and 31. At this time, the changeover valve 39a is opened, the heating medium supplied from the heating medium supply device 33 is circulated from the heating medium delivery pipe 35 through the bypass pipe 39 and the heating medium discharge pipe 36 to the heating medium supply device 33.

In the embodiment, the injection molding control device 50 executes a processing determined on the basis on a previously introduced computer program in a series of injection molding cycles to perform temperature control described below.

Figure 4:
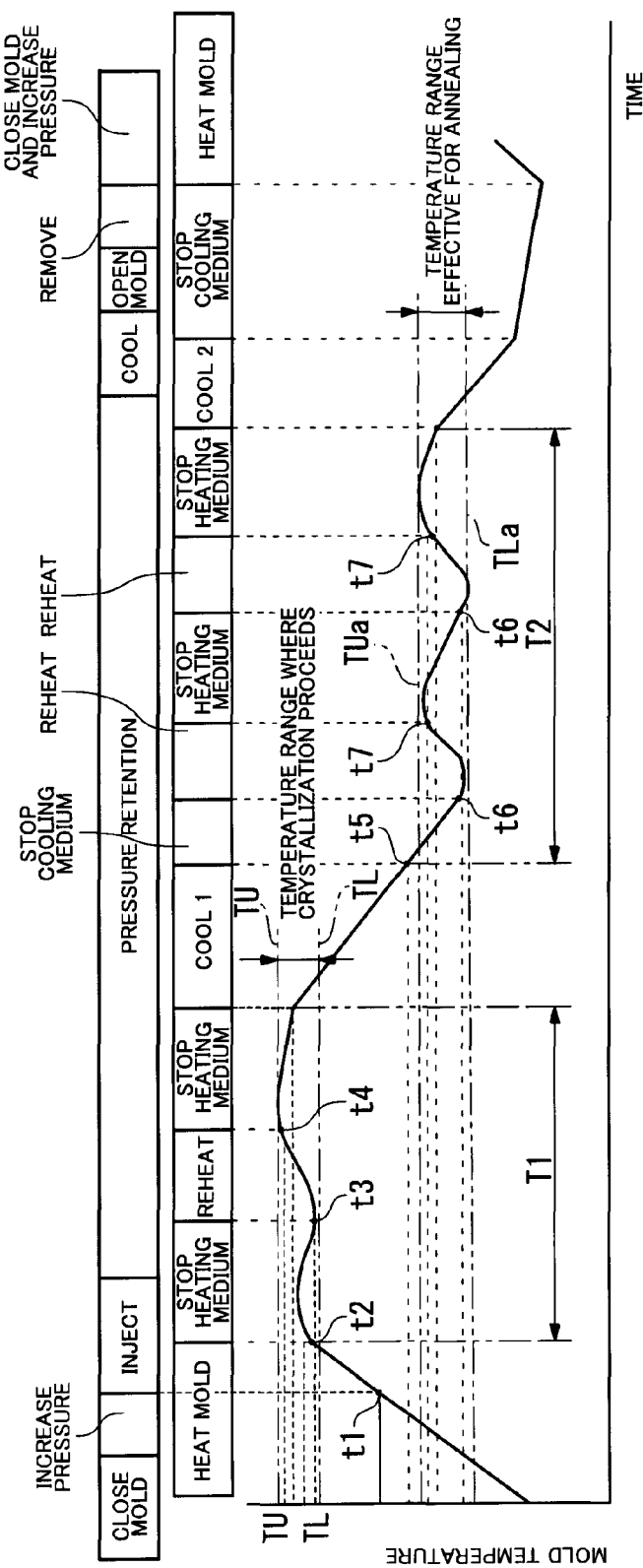
FIG. 4 shows mold temperature changes in a series of molding cycles in the embodiment.

FIG. 4 shows temperature changes in the series of injection molding cycles. Since the injection molding control device 50 controls temperatures (mold temperatures) of the fixed mold 13 and the movable mold 14, FIG. 4 shows mold temperature changes, but substantially the same applies to a cavity temperature.

From a mold closing step to a temperature increasing step, the on-off valves 35a and 36a are opened and the on-off valves 37a and 38a and the changeover valve 39a are closed, the heating medium heated by the heating medium supply device 33 is fed into the heat medium water passages 30 and 31 to heat the fixed mold 13 and the movable mold 14.

When the temperatures of the fixed mold 13 and the movable mold 14 reach a predetermined temperature t1, injection of the molten resin into the mold cavity formed by mold clamping of the fixed mold 13 and the movable mold 14 is started. After the start of the injection, heating of the fixed mold 13 and the movable mold 14 is continued by the supply of the heating medium from the heating medium supply device 33 to the heat medium water passages 30 and 31.

When the temperatures of the fixed mold 13 and the movable mold 14 reach a predetermined temperature t2, the supply of the heating medium from the heating medium supply device 33 to the heat medium water passages 30 and 31 is stopped. The supply of the heating medium is stopped by closing the on-off valves 35a and 36a. When the on-off valves 35a and 36a are closed, the changeover valve 39a is opened to circulate the heating medium. At this time, the on-off valves 37a and 38a remain closed, and the cooling medium is not supplied.

The temperatures of the fixed mold 13 and the movable mold 14 are increased by a delay of heat transfer and transfer of thermal energy of the heating medium remaining in the heat medium water passages 30 and 31 still after the supply of the heating medium is stopped. Thus, the temperature t1 as a trigger of the start of the injection and the temperature t2 as a trigger of the stop of the supply of the heating medium are set so that the temperatures of the fixed mold 13 and the movable mold 14 do not exceed an upper limit TU of a temperature range where crystallization of the injected resin proceeds still after the supply of the heating medium is stopped.

Then, when the injection of the resin is completed, the process moves to a pressure retention step in the mold cavity.

From an injection step to the pressure retention step, the temperatures of the fixed mold 13 and the movable mold 14 are reduced by natural heat dissipation with the stop of the supply of the heating medium. When the temperatures of the fixed mold 13 and the movable mold 14 are reduced to a predetermined temperature t3, the changeover valve 39a is closed and the on-off valves 35a and 36a are opened, and the heating medium is supplied from the heating medium supply device 33 to the heat medium water passages 30 and 31 to reheat the fixed mold 13 and the movable mold 14. The temperature t3 is set so that the temperatures of the fixed mold 13 and the movable mold 14 that are further reduced by the delay of the heat transfer after the start of the reheating does not become lower than a lower limit TL of the temperature range where crystallization of the resin proceeds. When the reheating is started, the heating medium is circulated through the bypass pipe 39, and the bypass pipe 39 is provided as close as possible to the fixed mold 13 and the movable mold 14, and thus the on-off valves 35a and 36a can be opened to immediately feed the heating medium into the heat medium water passages 30 and 31 to allow rapid reheating.

After the start of the reheating, when the temperatures of the fixed mold 13 and the movable mold 14 reach a predetermined temperature t4, the on-off valves 35a and 36a are closed and the changeover valve 39a is opened, and the supply of the heating medium from the heating medium supply device 33 to the heat medium water passages 30 and 31 is again stopped. The temperature t4 may be equal to the temperature t2 or higher than the temperature t2 for heating to near the upper limit TU of the temperature range where crystallization of the resin proceeds.

When a predetermined time T1 has elapsed since the temperatures of the fixed mold 13 and the movable mold 14 reach the predetermined temperature t4 and the supply of the heating medium is stopped, the process moves to cooling of the fixed mold 13 and the movable mold 14. Until the predetermined time T1 has elapsed, the above described temperature control is repeated as required so that the temperatures of the fixed mold 13 and the movable mold 14 are maintained between the upper limit TU and the lower limit TL of the temperature range where crystallization of the resin proceeds. This reliably facilitates crystallization of the resin.

In the cooling of the fixed mold 13 and the movable mold 14, the on-off valves 35a and 36a are closed and the on-off valves 37a and 38a are opened, and the cooling medium supplied from the cooling medium supply device 34 is fed into the heat medium water passages 30 and 31.

The cooling medium is fed to rapidly cool the fixed mold 13 and the movable mold 14. When the temperatures of the fixed mold 13 and the movable mold 14 are reduced to a predetermined temperature t5, the supply of the cooling medium to the heat medium water passages 30 and 31 is stopped. To stop the supply of the cooling medium, the on-off valves 37a and 38a only are closed and the on-off valves 35a and 36a are not opened.

After the supply of the cooling medium is stopped, the temperatures of the fixed mold 13 and the movable mold 14 are further reduced by the delay of the heat transfer, transfer of thermal energy of the cooling medium remaining in the heat medium water passages 30 and 31, and natural heat dissipation. The temperature t5 is previously set so that the temperature reduction does not cause the temperatures of the fixed mold 13 and the movable mold 14 to become lower than a lower limit TLa of a temperature range effective for resin annealing.

When the temperatures of the fixed mold 13 and the movable mold 14 are reduced to a predetermined temperature t6, the changeover valve 39a is closed and the on-off valves 35a and 36a are opened, and the heating medium is supplied from the heating medium supply device 33 to the heat medium water passages 30 and 31 to reheat the fixed mold 13 and the movable mold 14. This increases the temperatures of the fixed mold 13 and the movable mold 14.

Then, when the temperatures of the fixed mold 13 and the movable mold 14 reach a predetermined temperature t7, the on-off valves 35a and 36a are closed and the changeover valve 39a is opened, and the supply of the heating medium from the heating medium supply device 33 to the heat medium water passages 30 and 31 is stopped. The temperature t7 is previously set so that the temperatures of the fixed mold 13 and the movable mold 14 that are increased still after the supply of the heating medium is stopped do not exceed the upper limit TUa of the temperature range effective for resin annealing.

After the supply of the heating medium is stopped, the temperatures of the fixed mold 13 and the movable mold 14 are reduced. When the temperatures are reduced to the predetermined temperature t6, the changeover valve 39a is closed and the on-off valves 37a and 38a are opened, and the heating medium is again supplied from the heating medium supply device 33 to the heat medium water passages 30 and 31 to reheat the fixed mold 13 and the movable mold 14.

Until a predetermined time T2 has elapsed since the temperatures of the fixed mold 13 and the movable mold 14 are reduced to the predetermined temperature t5 and the supply of the cooling medium to the heat medium water passages 30 and 31 is stopped, the above described temperature control is repeated as required so that the temperatures of the fixed mold 13 and the movable mold 14 are maintained between the upper limit TUa and the lower limit TLa of the temperature range effective for resin annealing. This allows reliable resin annealing.

After the predetermined time T2 has elapsed, the on-off valves 35a and 36a are closed and the on-off valves 37a and 38a are opened, and the cooling medium supplied from the cooling medium supply device 34 is fed into the heat medium water passages 30 and 31.

The cooling medium is fed to rapidly cool the fixed mold 13 and the movable mold 14.

After the resin is cooled and solidified and a molded product is formed in the mold cavity, the movable mold 14 is released from mold clamping to the fixed mold 13 to open the mold. Then, the movable mold 14 is separated from the fixed mold 13 by the operation of the moving hydraulic cylinder 17 to remove the molded product.

Thereafter, the above described cycles are repeated to successively perform injection molding of molded products.

As described above, after the start of the injection of the resin during the injection molding cycles, the temperature control is performed so that the temperatures of the fixed mold 13 and the movable mold 14 are maintained between the upper limit TU and the lower limit TL of the temperature range where crystallization of the resin proceeds. This reliably facilitates crystallization of the resin.

At this time, start timing of the injection and supply timing of the heating medium are set so that the temperatures of the fixed mold 13 and the movable mold 14 that are increased still after the supply of the heating medium is stopped do not exceed the upper limit TU of the temperature range where crystallization of the injected resin proceeds, and thus the temperatures can be maintained for a long time within the temperature range where crystallization of the resin proceeds to efficiently facilitate the crystallization of the resin.

The temperature control of the fixed mold 13 and the movable mold 14 is performed only by switching ON/OFF the supply of the heating medium, and cooling with the cooling medium or the like is not performed, thereby facilitating the temperature control. The temperature control is performed within the temperature range where crystallization of the resin proceeds, and thus can be efficiently performed without unnecessary cooling or the like. The temperature control may use PID (P: proportional, I: integral and D: derivative) control.

Further, the bypass pipe 39 is provided as close as possible to the fixed mold 13 and the movable mold 14, and thus when the heating medium is again supplied for reheating after the supply of the heating medium is stopped, the on-off valves 35a and 36a can be opened to immediately feed the heating medium into the heat medium water passages 30 and 31 to allow rapid reheating.

The temperatures of the fixed mold 13 and the movable mold 14 are always maintained between the upper limit TU and the lower limit TL of the temperature range where crystallization of the resin proceeds, which does not prevent the molecules of the resin from being easily moved unlike the case where the temperatures are reduced to a temperature lower than the temperature range, and prevents variations in crystallization quality.

In the process of cooling the resin, the temperature control is performed so that the temperatures of the fixed mold 13 and the movable mold 14 are maintained between the upper limit TUa and the lower limit TLa of the temperature region effective for resin annealing. This allows reliable resin annealing in the series of injection molding cycles. At this time, the temperatures of the fixed mold 13 and the movable mold 14 are maintained within the temperature range effective for resin annealing, thermal energy can be more effectively used than in the case of further reducing the temperatures. Further, rapid cooling with the cooling medium is performed before and after the annealing to shorten the molding cycles.

In the above described embodiment, temperature control described below may be effectively combined.

Temperature control to once stop the supply of the heating medium is herein performed in the temperature increasing process.

Figure 5:
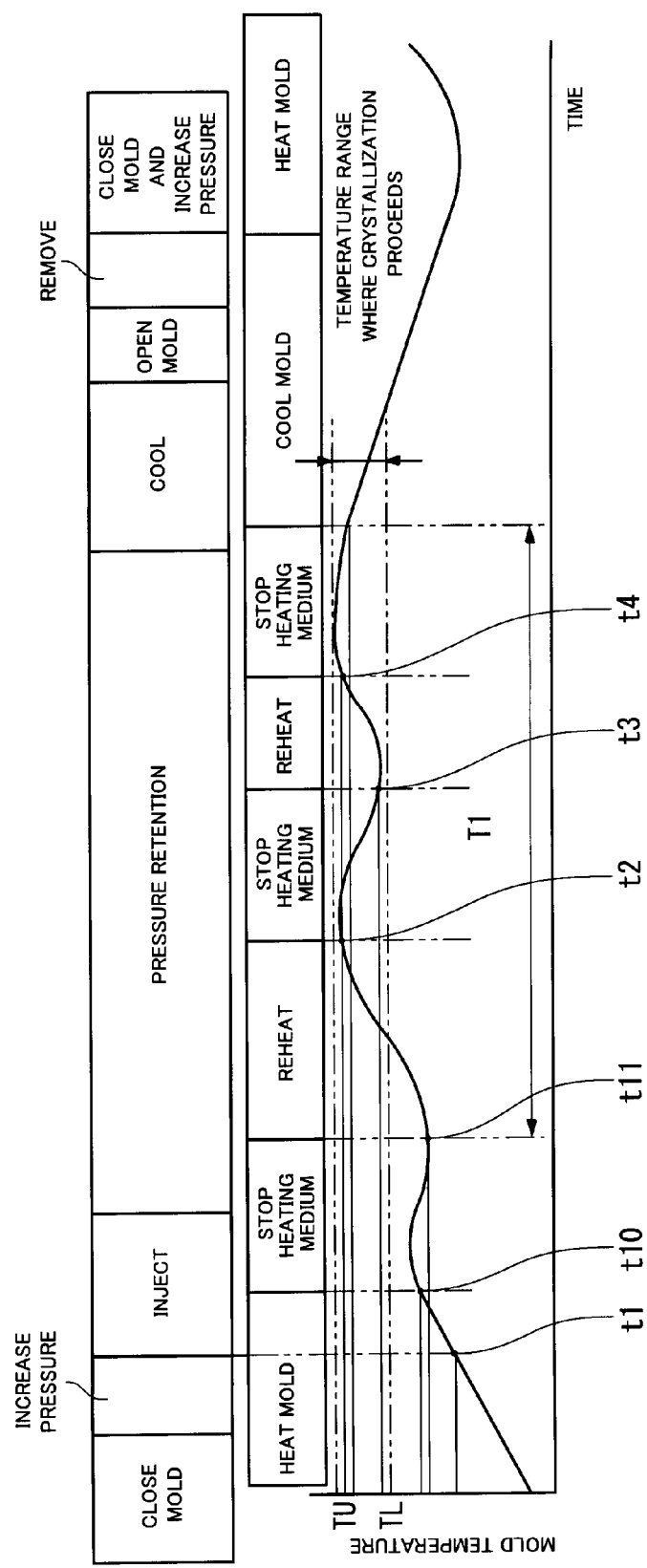
FIG. 5 shows maintaining the mold temperature during a temperature increasing process.
Figure 6:
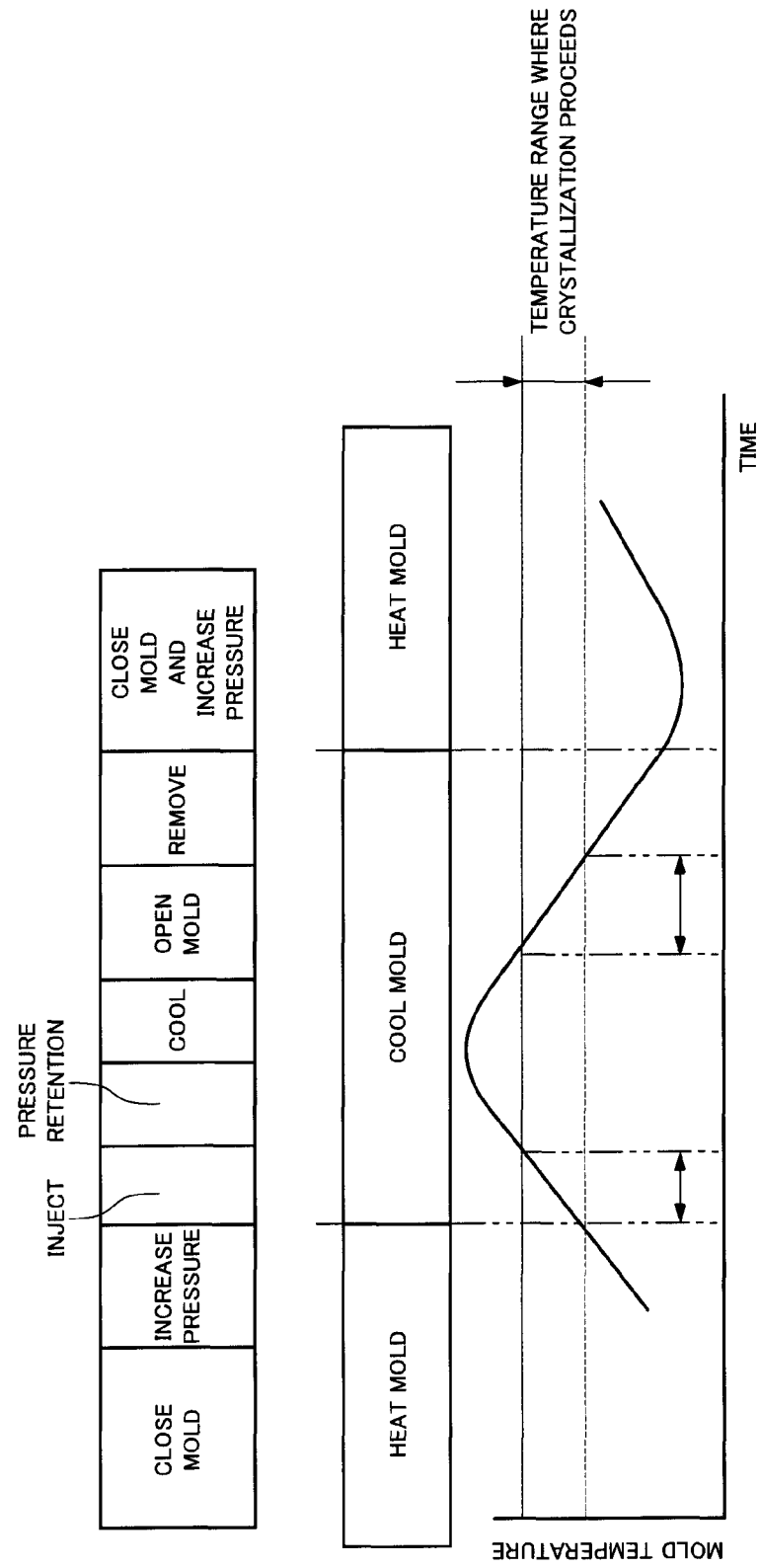
FIG. 6 shows mold temperature changes in a conventional method.

Specifically, as shown in FIG. 5, when the injection is started and then the temperatures of the fixed mold 13 and the movable mold 14 reach a temperature t10, the on-off valves 35a and 36a are closed and the changeover valve 39a is opened, and the supply of the heating medium from the heating medium supply device 33 to the heat medium water passages 30 and 31 is stopped. The temperature t10 is set to a temperature lower than the lower limit TL of the temperature range where crystallization of the resin proceeds.

After a certain time T10 has elapsed, or when the temperatures of the fixed mold 13 and the movable mold 14 are reduced to a predetermined temperature t11, the changeover valve 39a is closed and the on-off valves 35a and 36a are opened, and the heating medium is again supplied from the heating medium supply device 33 to the heat medium water passages 30 and 31 to reheat the fixed mold 13 and the movable mold 14.

Then, similarly to the case in FIG. 4, when the temperatures of the fixed mold 13 and the movable mold 14 reach the predetermined temperature t2, the supply of the heating medium from the heating medium supply device 33 to the heat medium water passages 30 and 31 is stopped, and temperature control is performed so that the temperatures of the fixed mold 13 and the movable mold 14 is maintained between the upper limit TU and the lower limit TL of the temperature range where crystallization of the resin proceeds.

When heating with the heating medium is performed, the temperature is increased rapidly near the heat medium water passages 30 and 31, and the temperature is more slowly increased at a more distant position from the heat medium water passages 30 and 31. In this connection, the supply of the heating medium is once stopped in the temperature increasing process after the injection is started, and the temperatures of the fixed mold 13 and the movable mold 14 are maintained within a certain temperature range as described above, thereby providing uniform temperature distribution of the fixed mold 13 and the movable mold 14. Heating by the supply of the heating medium is again performed after the uniform temperature distribution is obtained, a temperature increasing response to the heating is increased to allow the temperature control of the fixed mold 13 and the movable mold 14 to be performed with higher accuracy. This prevents the temperatures of the fixed mold 13 and the movable mold 14 from exceeding the upper limit of the temperature range where crystallization of the resin proceeds, and allows the above described advantages to be more reliable and prominent.

If the temperature t10 is equal to or lower than a thermal deformation temperature or a glass transition temperature of resin, and injection is performed before the certain time T10 has elapsed, the possibility that the molten resin enters a mold joint can be reduced to expect an advantage of preventing burrs.

In the above described embodiment, the temperatures t1 to t7, t10 and t11 are used as the triggers in the control, but elapsed times may be used as triggers in control. In this case, it is only necessary that tests are repeatedly conducted in advance to grasp elapsed times until the temperature t1 to t7, t10 and t11 are reached. Similarly, the times T1 and T2 are used as the triggers in the control, but detection temperatures may be used as triggers in control.

In the above described embodiment, the heat medium water is used as the heating medium, but vapor may be used. The vapor can be used in the same manner as in the above described embodiment except that the heating medium discharge pipe 36 is not connected to the heating medium supply device 33 and the vapor is discharged to the outside, and the vapor in the heating medium delivery pipe 35 is discharged to the outside by blowing air (unshown) when the supply of the heating medium is stopped.

In the above described embodiment, the supply of the heating medium is switched ON/OFF to maintain the temperature between the upper limit TUa and the lower limit TLa of the temperature range effective for resin annealing, but the supply of the cooling medium may be switched ON/OFF.

The present invention is directed to the temperature control during the injection molding cycle, and thus the configurations of the components of the injection molding system 10 are not limited to those described above, and appropriate changes may be made.

Also, the configurations in the embodiment may be selected or changed to different configurations without departing from the gist of the present invention.

The invention claimed is:

1. An injection molding system comprising:
an injection molding machine including a mold clamping device for opening and closing a mold and an injection device for injecting a molding material into a cavity of said mold;
a heating medium supply device for supplying a heating medium to a heat medium passage formed in said mold for heating said cavity;
a cooling medium supply device for supplying a cooling medium to said heat medium passage for cooling said cavity; and
a control unit for controlling supply of said heating medium and said cooling medium by said heating medium supply device and said cooling medium supply device, supplying said heating medium to said heat medium passage to heat said cavity when said molding material is injected from said injection device into said cavity, and supplying said cooling medium to said heat medium passage in conjunction with an injection step of said molding material to cool said cavity,
wherein said control unit starts the injection of said molding material or stops heating of said cavity during the injection before a temperature of said cavity reaches a predetermined temperature range so that the temperature of said cavity does not exceed the predetermined temperature range during the injection of said molding material due to a delay of heat transfer after the supply of the heating medium is stopped, and then maintains the temperature of said cavity within said predetermined temperature range after the temperature of said cavity reaches said predetermined temperature range and until said cooling medium is supplied to start cooling of said cavity, wherein the temperature of said cavity is maintained within said predetermined temperature range by alternating between natural heat dissipation with the stop of the supply of the heating medium and reheating with the supply of the heating medium.

2. The injection molding system according to claim 1, wherein said control unit starts the injection of said molding material or stops the heating of said cavity during the injection before the temperature of said cavity reaches said predetermined temperature range, and thus stops the heating of said cavity at an end of a timer that starts with the start of the heating of the cavity, or by detection that the temperature of said cavity reaches a predetermined temperature so as not to exceed an upper limit of said predetermined temperature range of said molding material.

3. The injection molding system according to claim 1, wherein vapor or a liquid is used as said heating medium.

4. The injection molding system according to claim 1, wherein said control unit switches ON/OFF the supply of said heating medium to said heat medium passage to maintain the temperature of said cavity within the predetermined temperature range.

5. The injection molding system according to claim 4, wherein when the supply of said heating medium to said heat medium passage is OFF, said control unit maintains said heating medium in said heat medium passage, or discharges said heating medium by air, and does not supply said cooling medium.

6. The injection molding system according to claim 4, further comprising:
a supply pipe for feeding said heating medium from said heating medium supply device to said heat medium passage;
a discharge pipe for discharging said heating medium from said heat medium passage; and
a bypass pipe for connecting said supply pipe and said discharge pipe, and bypassing said heating medium from said supply pipe to said discharge pipe when the supply of said heating medium to said heat medium passage by said heating medium supply device is OFF.

7. The injection molding system according to claim 6, wherein said bypass pipe is connected near a connection between said supply pipe and said heat medium passage.

8. The injection molding system according to claim 1, wherein said control unit supplies said heating medium to said heat medium passage to heat said cavity, stops the heating of said cavity at a lower temperature than said predetermined temperature range and maintains the temperature of said cavity within a temperature range including the temperature at which said heating is stopped for a predetermined time before the temperature of said cavity reaches said predetermined temperature range, and then again increases the temperature to said predetermined temperature range.

9. The injection molding system according to claim 8, wherein the injection is performed within the temperature range lower than the predetermined temperature range and including the temperature at which the heating is stopped.

10. The injection molding system according to claim 1, wherein said control unit supplies said cooling medium to said heat medium passage after completion of the injection or before the completion of the injection by a delay of a cooling response in a process of supplying said cooling medium to said heat medium passage in conjunction with the injection step of said molding material to cool said cavity, and maintains the temperature of said cavity within a temperature range where said molding material is annealed after the supply of the cooling medium is stopped.

11. The injection molding system according to claim 10, wherein said control unit switches ON/OFF the supply of said heating medium or said cooling medium to said heat medium passage to maintain the temperature of said cavity within the temperature range where said resin is annealed.

12. The injection molding system according to claim 1, wherein said predetermined temperature range is a temperature range where crystallization of a crystalline molding material proceeds.

13. A computer program for causing a control unit to execute a predetermined processing, said control unit controlling supply of a heating medium and a cooling medium to a heat medium passage formed in a mold of an injection molding machine for controlling a temperature of a cavity of said mold, comprising the steps of:
supplying said heating medium to said heat medium passage to heat said cavity when injecting a molding material into said cavity;
starting the injection of said molding material or stopping heating of said cavity during the injection before the temperature of said cavity reaches a predetermined temperature range so that the temperature of said cavity does not exceed said predetermined temperature range due to a delay of heat transfer after the supply of the heating medium is stopped;
maintaining the temperature of said cavity within said predetermined temperature range after the temperature of said cavity reaches said predetermined temperature range, by alternating between natural heat dissipation with the stop of the supply of the heating medium and reheating with the supply of the heating medium; and
supplying said cooling medium to said heat medium passage to cool said cavity after completion of the injection of said molding material or before the completion of the injection by a delay of a cooling response.

14. The computer program according to claim 13, wherein the step of maintaining the temperature of said cavity within said predetermined temperature range includes controlling the supply of said heating medium to said heat medium passage on the basis of the temperature of said cavity or an elapsed time.

15. The computer program according to claim 13, wherein said predetermined temperature range is a temperature range where crystallization of a crystalline molding material proceeds.

16. A method of injection molding comprising the steps of:
supplying a heating medium to a heat medium passage provided in a mold to heat a cavity when injecting a molding material into said cavity;
starting the injection of said molding material or stopping heating of said cavity during the injection before the temperature of said cavity reaches a predetermined temperature range so that the temperature of said cavity does not exceed said predetermined temperature range due to a delay of heat transfer after the supply of the heating medium is stopped;
maintaining the temperature of said cavity within said predetermined temperature range after the temperature of said cavity reaches said predetermined temperature range, by alternating between natural heat dissipation with the stop of the supply of the heating medium and reheating with the supply of the heating medium; and
supplying said cooling medium to said heat medium passage to cool said cavity after completion of the injection of said molding material or before the completion of the injection by a delay of a cooling response.

17. The method of injection molding according to claim 16, wherein said predetermined temperature range is a temperature range where crystallization of a crystalline molding material proceeds.

18. An injection molding machine comprising:
a mold driving unit for opening and closing a mold;
an injection cylinder for injecting a crystalline molding material into a cavity of said mold;
a heating medium supply mechanism for supplying a heating medium to a heat medium passage formed in said mold for heating said cavity;
a cooling medium supply mechanism for supplying a cooling medium to said heat medium passage for cooling said cavity; and
a control unit for controlling supply of said heating medium and said cooling medium by said heating medium supply mechanism and said cooling medium supply mechanism, supplying said heating medium to said heat medium passage to heat said cavity when said molding material is injected from said injection cylinder into said cavity, and supplying said cooling medium to said heat medium passage to cool said cavity after the injection of said molding material is completed,
wherein said control unit stops heating of said cavity before starting the injection of said molding material from said injection cylinder into said cavity so that the temperature of said cavity does not exceed a temperature range where crystallization of said molding material proceeds, and maintains the temperature of said cavity within the temperature range where crystallization of said molding material proceeds after the injection of said molding material from said injection cylinder into said cavity is started and until said cooling medium is supplied to start cooling of said cavity, wherein the temperature of said cavity is maintained within said predetermined temperature range by alternating between natural heat dissipation with the stop of the supply of the heating medium and reheating with the supply of the heating medium.

19. The injection molding machine according to claim 18, further comprising:
   a supply pipe for feeding said heating medium from said heating medium supply mechanism to said heat medium passage;
   a return pipe for returning said heating medium discharged from said heat medium passage to said heating medium supply mechanism; and
   a bypass pipe for connecting said supply pipe and said return pipe and bypassing said heating medium from said supply pipe to said return pipe when the supply of said heating medium to said heat medium passage by said heating medium supply mechanism is OFF.

* * * * *